Oct. 8, 1935.  F. Y. CHUCK  2,016,592
PROCESS FOR STABILIZING MILK POWDER AND SIMILAR COLLOIDAL PRODUCTS
Filed April 15, 1930
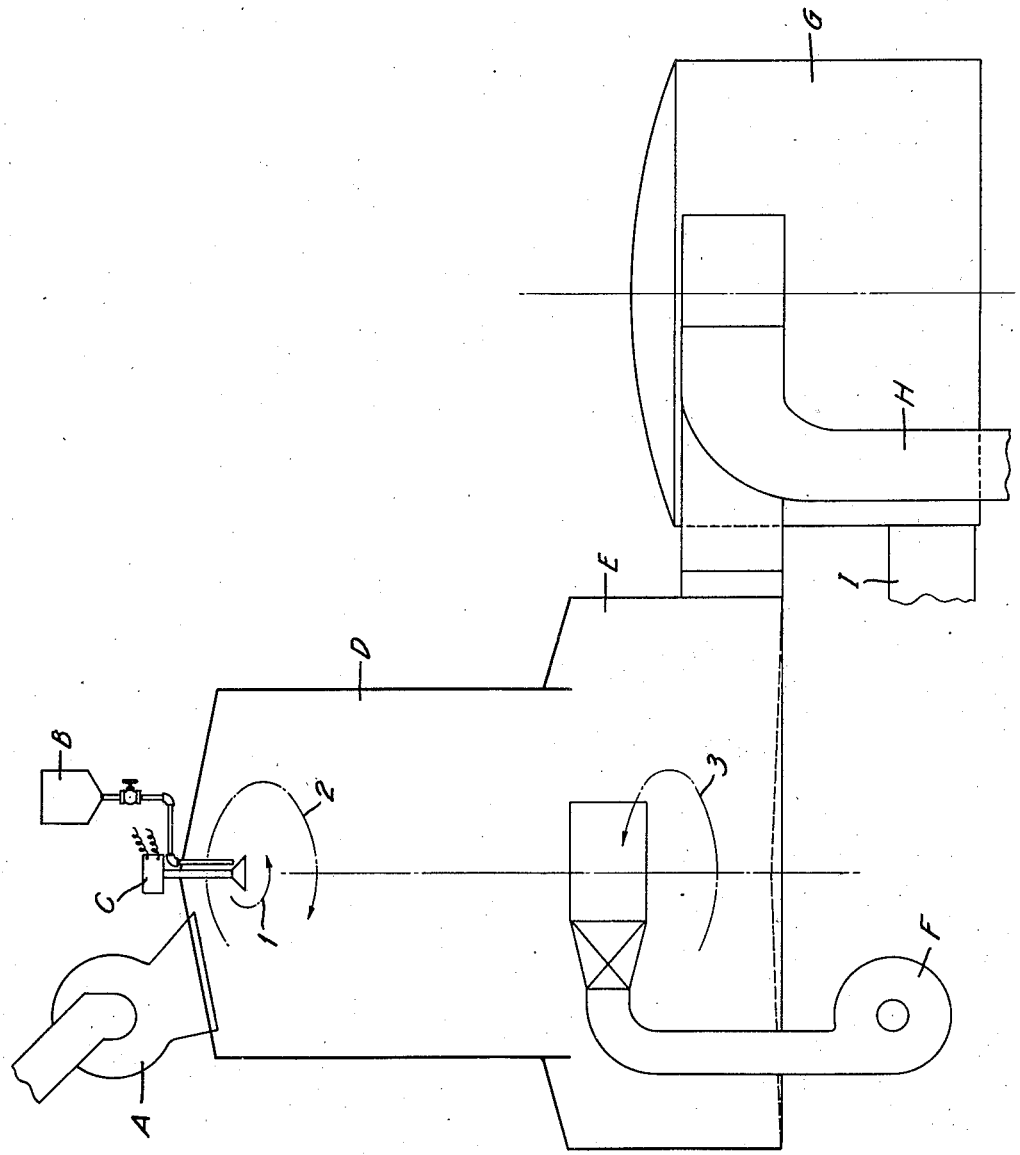
INVENTOR.
F. Y. Chuck
BY
White, Prost, Fleke & Lothrop
ATTORNEYS.

UNITED STATES PATENT OFFICE 2,016,592

PROCESS FOR STABILIZING MILK POWDER AND SIMILAR COLLOIDAL PRODUCTS

Faw Yap Chuck, Petaluma, Calif., assignor to Western Condensing Company, Petaluma, Calif., a corporation of California Application April 15, 1930, Serial No. 444,631

7 Claims. (Cl. 99—11)

This invention relates to the principles and processes by which a colloidal product like milk powder, which contains some material or materials as its constituent part or parts, that are hydroscopic, solvent absorbing, or unstable, can be rendered non-hydroscopic, non-absorbing of solvent, non-caking or stable, by hydrating, solvating or stabilizing the said constituent material or materials without appreciably destroying or altering the colloidal properties of the colloidal constituent part or parts of the said colloidal product.

Milk powder may be taken to illustrate the salient objects of this invention in producing a stabilized, non-hydroscopic and non-caking product without sacrificing its original taste, re-solubility of any of its original properties. The milk of all mammals consists of lactose and mineral salts in true solution; casein, lactalbumin and lactoglobulin as colloidal suspension and the fats in emulsion. By the usual process of desiccation, the solution of all these materials is dried instantaneously while being atomized into a current of hot gases or dried on heated rolls. The proteins when dried in this manner exist in aggregates of particles of colloidal dimension; the fats in practically the same state of division as in the liquid milk; the mineral salts in the crystalline state and the lactose, partly crystalline and partly amorphous. In other words by drying the atomized liquid milk instantaneously as it is done by the spray process of desiccation, the physical states of all the milk constituents are not changed, except that of the lactose, which exists as alpha and beta lactose hydrates in equilibrium, is dehydrated, giving anhydrides of the corresponding isomers of the sugar. The changes may be explained by the theories of muta-rotation of lactose as has been shown by Hudson (J. Am. Chem. Soc. 30, 1767, 1908) first and later by Gillis (Rec. Trav. Chem. 39, 88, 1920).

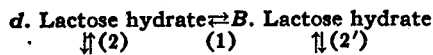
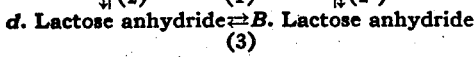

Reaction (1) is the equilibrium reaction of the two forms of lactose hydrate in solution with an equilibrium constant of 1.63; reaction (2) and (2′) are dehydration reactions which take place when the sugar solution is desiccated and reaction (3) is the equilibrium reaction of the two forms of lactose anhydride, the relative proportion of which depends on temperature, time of desiccation and the concentration of the solution as indicated by the work of Bell (Ind. & Eng. Chem. 22, 51 (1930)).

Hudson (Princeton University Bull. 13, (4), 63, 1902) and other investigators showed that the anhydrides of lactose absorb water from the air, that is, are hydroscopic. The following hydration reaction as formulated by Gillis (loc. cit.) undoubtedly takes place:—

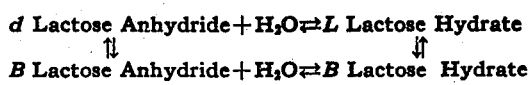

The rate of moisture absorption is very fast. On account of the uneven contact between the lactose anhydrides and moisture, there is usually more moisture absorbed than actually required to complete the above reactions. The excessive moisture forms a sticky mass with the lactalbumin and the beta form of lactose. Evaporation of this excess moisture takes place slowly on account of the limited surface exposed. After the powder has gone through the caking process, it is non-hydroscopic and non-sticky, but has lost the greater part of its solubility and also has a cheesy taste.

Furthermore, if the milk or milk product be heated above 93.5 degrees centigrade while in the liquid state and desiccated immediately or the milk product be heated above this transition point of alpha to beta lactose in the course of desiccation, the great part of the lactose will be in the form of beta lactose anhydride. (Hudson J. Am. Chem. Soc. 30, 1767–1908, Gillis-Rec. Trav. Chem. 39, 88, 1920. Bell-Ind. Eng. Chem. 22–51, 1930.)

When this anhydride comes in contact with water, it immediately changes to the beta hydrate form which according to Gillis (ibid) is very soluble. At the same time if the temperature of the material be kept below 93.5 degrees centigrade, this beta hydrate will slowly go over to the alpha hydrate, which is comparatively much less soluble in water than beta hydrate. This is also the reason for the time required for milk powder that has been caked to change from the sticky stage to non-sticky stage. In the former stage the lactose (wholly or in part) exists in the form of beta hydrate which is in solution by reason of its high solubility. In the latter stage the lactose is in the form of alpha hydrate, which would easily crystallize because of its lower solubility forming gritty crystals. These are invariably present in milk powder that has gone through the caking process.

Because of the danger of caking, dried milk is packed in paper lined barrels, which adds to the cost of the product. Even with this expensive method of packing, the caking will still occur in the course of five to six months.

Peebles and Manning were the first to discover that the caking of milk powder is due to the lactose in the anhydrous form and invented a method of producing a non-caking powder. However, no process has yet been invented whereby the different kinds of dry milk products can be stabilized without sacrificing their original solubility and taste. As the lactose in the beta form is sweeter than in the alpha form, it is desirable to keep it in the beta form after the milk product has been stabilized. No process is known prior to this invention whereby a non-hydroscopic and non-caking milk powder is produced with the lactose largely in the form of beta hydrate.

It is an object of this invention to furnish such a process. The basic principles involved in this invention are:

(1.) The theory of Hudson and of Gillis that the hydration of lactose anhydrides to lactose hydrates if instantaneous holds true for the reaction in milk powder. The reason this does not seem possible to previous investigators is because it takes considerable time to evaporate the excessive moisture from the plastic mass. The change of the very soluble beta lactose to the less soluble alpha lactose also requires considerable time and not until both these take place does the mass become powdery again. This time of evaporation and transition of the two forms of lactose has been mistaken for time of hydration of lactose anhydrides. This reaction is instantaneous when the moisture is added to the powder in such a way that very porous masses are formed so that the evaporation of the excessive moisture is rapid. This point has been proven by experiments, which have now been reduced to practice.

(2.) The transition of beta lactose hydrate to alpha lactose hydrate is very slow (about twenty to twenty-four hours) at ordinary temperature provided the sugar is kept on the acid side. By hydrating the beta lactose anhydrides rapidly and removing the excessive moisture immediately the beta lactose would not stay in solution longer than necessary to effect the change to the beta hydrate, which reaction takes place instantaneously. Under such conditions the beta lactose hydrate has little opportunity of transitionally changing over to the alpha form or vice versa. This has been proven by studies of the crystalline structure and solubility of the beta lactose before and after hydration and also by the fact that pure beta lactose anhydride hydrated as described retains its sweet taste. By heating the liquid milk or milk product to above 93.5° C., and immediately desiccating it, or by any suitable process or processes whereby the lactose in the dried product is converted largely to beta anhydride, and then hydrating the same by method outlined above, a non-hydroscopic and non-caking milk or milk product powder is produced containing lactose largely as beta hydrate. This product is much sweeter than the corresponding product manufactured by the usual processes containing lactose largely in the form of alpha lactose anhydride.

The transitional changes between the two forms of lactose play an important part in the stabilization of milk powder as shown by the fact that ammonia or sodium carbonate when added to the sticky mass of milk powder making it slightly alkaline will hasten very materially the change from the sticky stage to the non-sticky stage, because in alkaline medium the transitional change of beta to alpha lactose or vice versa is instantaneous.

(3.) The theory that gives us a logical and practical explanation of the cause for the coagulation of the greater part of the protein after the milk powder has been caked is that the excessive absorbed moisture in the plastic mass is too slow in evaporating, therefore it forms a solution of the electrolytes and lactose surrounding the colloidal aggregates of the complex salts of calcium and casein and of lactalbumin, part of which may also exist in the form of salts. Such colloidal protein aggregates may be pictured in the light of the Donnan theory (Z. Elektrochemie 17, 572, 1911) as being composed of a semi-permeable protein membrane inclosing the ionizable protein salts. In the case of casein, for instance, the complex calcium caseinate is inclosed by a casein membrane to which the electrolyte ions and lactose are permeable, but impermeable to the caseinate ion. When such particle is put in a solution of electrolytes and lactose, as it happens in the case involved, the Donnan membrane equilibrium will set up with the concentration of diffusible ions and sugar molecules stronger on the inside of the membrane than on the outside. The unequal distribution of diffusible material between the two sides of the membrane, and consequently unequal osmotic pressure causes an infusion of water into the membrane. This latter action brings about the swelling of the colloidal casein particles as it has been demonstrated by Proctor and Wilson, (J. Chem. Soc. 109, 307, (1916)) and at the same time increases the viscosity of the swollen protein particles as has been explained by Loeb (J. Gen. Physiol. 3, 827 (1920–1); 4, 73, 97, (1921–22)). This series of physical changes increase the size of the casein aggregates beyond colloidal dimensions, hence they will not form a colloidal solution when mixed with water.

As casein exists entirely in the form of complex calcium salt, the Donnan equilibrium can be set up as explained above. In any milk powder wherein the majority of the protein is casein, most of the protein should be coagulated in this way. Lactalbumin and lactoglobulin exist only partially in the form of salts. In whey powder the protein content is entirely composed of these two substances, and therefore less of the protein can be coagulated by this caking process. This conclusion is sound as the following determinations will show:

| Kind of dried milk | Before caking | | After caking | | Percentage of coagulation |
|---|---|---|---|---|---|
| | Soluble protein | Coagulated protein | Soluble protein | Coagulated protein | |
| 80% of total protein is casein 20% of total protein is lactalbumin | *Percent* | *Percent* | *Percent* | *Percent* | *Percent* |
| Dried whole milk | 21.2 | 0.4 | 18 | 3.6 | 85.7 |
| Dried skim milk | 34.1 | 0.6 | 15.4 | 29.3 | 85.0 |
| Dried buttermilk | 33.8 | 0.7 | 15.8 | 28.7 | 84.0 |
| 100% of total protein is lactalbumin and lactoglobulin | | | | | |
| Dried whey | 11.3 | 0.8 | 5.4 | 6.7 | 55.3 |

When a current of finely atomized water (the weight of which is about 6-8% of that of the milk) is mixed in with the milk powder suspended in the air, very light and porous cotton-like icicle shaped flocks are formed. The lactose anhydrides will immediately take up 5% of their weight and instantaneously become lactose hydrates. The excessive water is quickly evaporated off by allowing the moistened flocks of powder to whirl around in a current of warm gases. The dried product comes out of this cyclone in snow-like flocks as light as cotton. It can be easily reduced to a fine fluffy non-hydroscopic powder by just shaking it on a screen. Its solubility tested by the Wisconsin sediment test and also by chemical analysis for soluble and coagulated protein content showed practically no difference in solubility between this stabilized powder and the original.

*Before stabilized*

| Kinds of dried milk | Soluble protein | Coagulated protein | Percentage of total protein as soluble protein |
|---|---|---|---|
| | Percent | Percent | Percent |
| Dried whole milk | 21.4 | 0.35 | 98.5 |
| Dried skim milk | 34.6 | 0.3 | 99.2 |
| Dried buttermilk | 33.7 | 0.5 | 98.5 |
| Dried whey | 11.5 | 0.1 | 99.2 |

*After stabilizing*

| Kinds of dried milk | Soluble protein | Coagulated protein | Percentage of total protein as soluble protein |
|---|---|---|---|
| | Percent | Percent | Percent |
| Dried whole milk | 21.2 | 0.42 | 98.0 |
| Dried skim milk | 33.2 | 0.5 | 98.7 |
| Dried buttermilk | 33.0 | 0.3 | 98.2 |
| Dried whey | 11.0 | 0.2 | 99.0 |

The above results show that whenever the excessive water can be rapidly eliminated so that the Donnan equilibrium will not set up, any swelling of the protein particles will be prevented, thus preserving the colloidal state. This explains how the solubility of the protein can be preserved, while carrying out the hydration of the lactose.

(4.) The cheesy taste developed after milk powder has been caked is due to fermentative side reactions of the proteins. As heat is generated in the moist cake thus accelerating the reactions, such off-taste can be easily developed. However, if the excessive moisture is rapidly eliminated as described above, such side reactions are suppressed. The product thus stabilized has no off-taste or undesirable flavor.

In carrying out the above process the essential conditions are: first, intimate mixing of the anhydrous milk product powder maintained in the finely divided state, with finely atomized water. The moisture so introduced must be sufficient to hydrate all the lactose anhydrides. Theoretically these take up 5% by weight of water in converting over to the hydrates. Due to the mechanical difficulty of making every particle of lactose contact with the moisture and absorb the necessary amount of it, some excess over the theoretical quantity is required to completely hydrate all the lactose anhydrides. In practice the amount of moisture that gives the best results is eight per cent of the weight of lactose anhydride in the milk product. Second: The product must be kept in the finest divided state possible through the whole process. Third: The excessive moisture must be eliminated immediately after the hydration is completed. This can best be accomplished by moving the moist hydrated product in a current of air or any suitable gases of sufficient quantity and temperature to effect the evaporation of the desired amount of moisture.

To accomplish or fulfill the first and second conditions any one of the three different methods can be used:

A. By introducing the finely divided product to be hydrated or solvated into a chamber of finely atomized water or any solvent.

B. By introducing the finely atomized water or any desired solvent into a chamber of finely suspended product to be hydrated or solvated.

C. By cooling the mixture of anhydrous milk powder together with the moisture in the gaseous state coming out from the desiccator (as in the case of the spray process for the desiccation of milk products) to such temperature as to allow sufficient moisture condensing to completely hydrate the lactose anhydrides.

By keeping the colloidal powder suspended in a series of cyclones throughout the whole process the second condition is fulfilled.

The third condition can be fulfilled by introducing the hydrated or solvated product into a cyclone of warm air or gases of such temperature as to evaporate off the desired amount of water or solvent.

There are many types of mechanical apparatus which can be designed to carry out the whole process. One of these is illustrated here:

The figures show the essential parts of the apparatus. The anhydrous milk powder from the collector or hopper is introduced into the hydration chamber D by means of fan A. A vane is fixed at the outlet of the latter so as to give the current of air carrying the powder, a direction. The powder will then whirl around in the direction indicated by arrow 2. A regulated stream of water is allowed to run from water tank B to centrifugal atomizer C, which revolves in the direction af arrow 1. The anhydrous powder coming in contact with the atomized water forms very light loose flocks of hydrated product. These are allowed to work down to cyclone E, where they are whirled around in the direction of arrow 3. The latter operation is to hydrate any lactose anhydrides that may have escaped the reaction in the hydration chamber.

The hydrated product coming out of cyclone E is blown into cyclone G together with the warm air coming in thru H. The excessive moisture is carried off by the warm air and the dry hydrated powder is run out through I, which leads to suitable dust collecting system. The product is then reduced to a powder again by forcing it thru a screen.

Having thus far described my invention, I claim:—

1. In a method of treating powdered material containing lactose in anhydrous form, causing the powdered material to take up moisture while in suspension in a gaseous medium to cause crystallization of the lactose, and then removing excess moisture at a rapid rate while the material is in suspension in a gaseous medium.

2. In a method of treating powdered material containing lactose in anhydrous form, causing the powdered material to take up moisture to cause crystallization of the lactose, and then removing excess moisture while the material is in suspension in a gaseous medium so that coagulation of albumin is made negligible.

3. In a method of treating powdered material containing lactose in anhydrous form, causing the powdered material to take up moisture while in suspension in a gaseous medium, to an extent sufficient to cause crystallization of the lactose plus a slight excess, and then causing the material to be carried in suspension by a current of relatively warmer drying gas to effect rapid removal of excess water, without removing water of crystallization absorbed by the lactose.

4. In a method of manufacturing milk products in powdered condition, heating a liquid lacteal material to a temperature, as exemplified by a temperature in excess of 93.5° C., whereby substantially all of the alpha lactose is converted to the beta form, rapidly desiccating the material to dry powdered form, causing the powdered material to take up moisture while in suspension in a gaseous medium, and then removing excess moisture while the material is in suspension in a gaseous medium, whereby the resulting product contains lactose having water of crystallization and substantially entirely in the beta form.

5. In a method of manufacturing milk products in powdered condition from liquid lacteal material containing lactose, heating the liquid lacteal material to a temperature, as exemplified by a temperature in excess of 93.5° C., whereby substantially all of the alpha lactose is converted to the beta form, immediately desiccating the material to dry powdered form, causing the lactose of the desiccated material to take up moisture to render the material substantially non-hygroscopic, and then removing excess moisture at a rapid rate while the material is in suspension in a gaseous medium.

6. In a method of manufacturing substantially non-hygroscopic milk products in powdered condition from liquid lacteal materials containing substantial amounts of lactose, converting the lacteal material to an anhydrous powder by spray drying the material while the same is at an elevated temperature in excess of 93.5° C., hydrating the powdered material by causing it to take up moisture while in suspension in a gaseous medium, and then removing excess moisture from the material at a rapid rate and while the material is in suspension in a gaseous medium.

7. In a method of manufacturing non-hygroscopic milk products in powdered condition from liquid lacteal material containing lactose, heating the liquid lacteal material to a temperature, as exemplified by a temperature in excess of 93.5° C., whereby the major part of the lactose is converted to the beta form, then causing the liquid lacteal material to be converted to a non-fluid divided mass containing moisture in excess of that desired in the final product, the latter conversion being effected by reducing the moisture content and by causing the lactose to be crystallized without forming relatively large solid cakes, and then removing excess moisture at a rapid rate while the material is in suspension in a gaseous medium and without removing water of crystallization.

FAW YAP CHUCK.